(12) United States Patent
Jermann et al.

(10) Patent No.: US 8,729,786 B2
(45) Date of Patent: May 20, 2014

(54) ILLUMINANT MIXTURE FOR A DISCHARGE LAMP AND DISCHARGE LAMP, IN PARTICULAR AN HG LOW-PRESSURE DISCHARGE LAMP

(75) Inventors: Frank Jermann, Königsbrunn (DE); Armin Konrad, Großaitingen (DE); Martin Zachau, Geltendorf (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 0 days.

(21) Appl. No.: 12/452,193

(22) PCT Filed: Jul. 9, 2008

(86) PCT No.: PCT/EP2008/058935
§ 371 (c)(1),
(2), (4) Date: Dec. 18, 2009

(87) PCT Pub. No.: WO2009/010438
PCT Pub. Date: Jan. 22, 2009

(65) Prior Publication Data
US 2010/0102704 A1  Apr. 29, 2010

(30) Foreign Application Priority Data
Jul. 16, 2007 (DE) .......................... 10 2007 033 026

(51) Int. Cl.
*H01J 61/44* (2006.01)
*C09K 11/08* (2006.01)

(52) U.S. Cl.
USPC ............... 313/486; 313/487; 252/301.4 R (58) Field of Classification Search
USPC ............................ 313/487, 486; 252/301.4 R
See application file for complete search history.

(56) References Cited

U.S. PATENT DOCUMENTS

| | | | |
|---|---|---|---|
| 5,049,779 A | 9/1991 | Itsuki et al. | |
| 5,422,538 A | 6/1995 | Ouwerkerk et al. | |
| 5,714,836 A * | 2/1998 | Hunt et al. | ........... 313/487 |
| 7,030,549 B2 | 4/2006 | Dutta | |
| 7,119,488 B2 | 10/2006 | Soules et al. | |
| 7,538,495 B2 | 5/2009 | Wada et al. | |

(Continued)

FOREIGN PATENT DOCUMENTS

| | | |
|---|---|---|
| CN | 1672239 A | 9/2005 |
| EP | 1 428 863 A1 | 6/2004 |

(Continued)

OTHER PUBLICATIONS

Translation of Chinese Office Action dated Aug. 8, 2011.

(Continued)

*Primary Examiner* — Karabi Guharay
(74) *Attorney, Agent, or Firm* — Holtz Holtz Goodman & Chick, P.C.

(57) ABSTRACT

The invention relates to an illuminant mixture for a discharge lamp (1) with a first and at least one second illuminant composition, said first illuminant composition having an emission spectrum in the green to yellow spectral range and having a first illuminant compound, devoid of Tb and designed to absorb the UV radiation emitted by an Hg source. The invention also relates to a discharge lamp (1) with a discharge vessel (2) and an illuminant layer (12) applied thereto, said layer containing the illuminant mixture according to the invention.

29 Claims, 3 Drawing Sheets

(56) References Cited

U.S. PATENT DOCUMENTS

| | | |
|---|---|---|
| 7,696,685 B2 | 4/2010 | Yamakawa et al. |
| 7,696,694 B2 | 4/2010 | Vossen et al. |
| 2004/0095058 A1 | 5/2004 | Dutta |
| 2004/0113539 A1 | 6/2004 | Soules et al. |
| 2006/0103315 A1* | 5/2006 | Vossen et al. ............... 313/635 |
| 2007/0132360 A1 | 6/2007 | Hildenbrand et al. |
| 2009/0091235 A1 | 4/2009 | Matsuo et al. |
| 2009/0096958 A1 | 4/2009 | Matsuura et al. |
| 2010/0102703 A1 | 4/2010 | Jermann et al. |
| 2010/0141114 A1 | 6/2010 | Jermann et al. |

FOREIGN PATENT DOCUMENTS

| | | |
|---|---|---|
| JP | 9007545 A | 1/1997 |
| JP | 10-106494 A | 4/1998 |
| JP | 2000-067813 A | 3/2000 |
| JP | 2001-200249 | 7/2001 |
| JP | 2003-234089 A | 8/2003 |
| JP | 2004-507040 A | 3/2004 |
| JP | 2005-008844 A | 1/2005 |
| JP | 2005-213288 A | 8/2005 |
| JP | 2006-098034 A | 4/2006 |
| JP | 2006-190658 | 7/2006 |
| JP | 2006-190658 A | 7/2006 |
| WO | WO 2005/045881 A1 | 5/2005 |
| WO | WO 2006/051768 A1 | 5/2006 |
| WO | WO 2006/095284 A1 | 9/2006 |
| WO | WO 2007/013688 A2 | 2/2007 |
| WO | WO 2007/054875 A1 | 5/2007 |
| WO | WO 2007/066733 A | 6/2007 |
| WO | WO 2007/111246 A1 | 10/2007 |

OTHER PUBLICATIONS

Japanese Office Action dated Mar. 7, 2012 issued in counterpart Japanese Application No. 2010-516466.

European Office Action dated Nov. 19, 2010 in counterpart European Application No. 08 774 940.4.

\* cited by examiner

| Group | lumnous flux, [lm] | efficacy, [lm/W] | x | y | CRI | color temperature, [K] |
|---|---|---|---|---|---|---|
| L58 1H 90/10 Sr-SION:Eu 1% | 3285 | 87,0 | 0,561 | 0,368 | 78 | 1507 |
| L581H 75/25 Sr-SION:Eu 1% | 3203 | 84,5 | 0,525 | 0,410 | 82 | 1990 |
| L581H 50/50 Sr-SION:Eu 1% | 3016 | 81,1 | 0,465 | 0,476 | 85 | 3089 |
| L581H / CAT, comparison | 3246 | 86,8 | 0,477 | 0,416 | 83 | 2514 |

ILLUMINANT MIXTURE FOR A DISCHARGE LAMP AND DISCHARGE LAMP, IN PARTICULAR AN HG LOW-PRESSURE DISCHARGE LAMP

This application is a U.S. National Phase Application under 35 USC 371 of International Application PCT/EP2008/058935, filed Jul. 9, 2008, which is incorporated herein in its entirety by this reference.

TECHNICAL FIELD

The invention relates to an phosphor mixture for a discharge lamp, which comprises a first phosphor composition and at least one second phosphor composition. The invention furthermore relates to a discharge lamp having a discharge vessel, on which an phosphor layer is formed.

PRIOR ART

For the coating of low-pressure Hg discharge lamps, it is general practice to use a blue, red and green phosphor for radiation conversion, in order to be able to achieve color temperatures of more than 2500 K in the region of the Judd isotherms, for example within the standardized IEC color tolerance ranges. The known phosphor mixtures conventionally used nowadays, for example BAM, CAT, YOE, for the most part convert the radiation generated by the low-pressure Hg discharge, with the wavelengths 185 nm and 254 nm, into visible light.

The highest efficiency is currently obtained with phosphors containing rare earths. The phosphor's emission spectrum lying in the green spectral range is essentially made possible by the Tb (terbium) emission, and the phosphor mixture's emission lying in the red spectral range is essentially made possible by doping with Eu (europium). For the optionally provided phosphor components emitting in the blue spectral range, or the phosphor composition of the phosphor mixture, emission likewise takes place by doping with Eu. For the phosphor compositions conventionally used at present for emission in the green spectral range (CAT, LAP and CBT), a relatively small amount of Ce (cerium) in addition to the Tb doping is used to improve the UV-Vis radiation conversion. Tb is a relatively expensive material, so that it increases the costs for the phosphor mixture and therefore also the costs of a discharge lamp.

SUMMARY OF THE INVENTION

It is an object of the present invention to provide an phosphor mixture for a discharge lamp, and a discharge lamp, with which it is possible to achieve energy efficiency class A and high color rendering, while at the same time the costs of the phosphor mixture and of the discharge lamp are intended to be reduced.

This object is achieved by a phosphor mixture which has the features as described herein, and by a discharge lamp which has the features as described herein.

An phosphor mixture according to the invention for a discharge lamp comprises a first and at least one second phosphor composition. The first phosphor composition has an emission spectrum in the green and/or yellow spectral range, and the first phosphor composition also comprises a first phosphor compound which is free of Tb and is furthermore designed to absorb the UV (ultraviolet) radiation emitted by an Hg source. By means of such an phosphor mixture, energy efficiency class A can be achieved and high color rendering of 80 is furthermore made possible. An phosphor mixture can furthermore be produced with reduced costs. The phosphor mixture according to the invention can ensure an equal, or in particular higher, efficiency compared with an phosphor mixture of the prior art; in particular, the first phosphor compound of the first phosphor composition is designed to be free of Tb, so that either the phosphor composition can be entirely without Tb or, at least, it can be provided with a significantly reduced amount of Tb in the second phosphor composition or another further phosphor composition of the phosphor mixture.

Preferably, the first phosphor compound of the first phosphor composition is designed to convert the absorbed UV radiation into its emission spectrum.

Preferably, the color temperature of the emitted radiation can be set as a function of an adjustable mass ratio between the first and second phosphor compositions.

The mass fraction of the first phosphor composition is preferably less than or equal to 50%. In particular, color temperatures of more than 2500 K can preferably be set with the phosphor mixture.

Thus, fluorescent lamps with a color temperature of more than 2500 K can be produced with the phosphor mixture, even in the region of the Judd isotherms. General color rendering in the region of 80 is achieved.

Preferably, the first phosphor compound of the first phosphor composition has strong absorption for radiation with wavelengths of less than 440 nm. Here, strong absorption means that the reflection by a pressed powder tablet in 45°/0° geometry, measured relative to an $Al_2O_3$ standard, is less than 60%.

Preferably, the first phosphor compound of the first phosphor composition has very strong absorption for radiation with wavelengths of about 254 nm. Here, very strong absorption means that the reflection by a pressed powder tablet in 45°/0° geometry, measured relative to an $Al_2O_3$ standard, is less than 40%.

Preferably, the first phosphor compound of the first phosphor composition has weak absorption for radiation with wavelengths of more than 530 nm. Here, weak absorption means that the reflection by a pressed powder tablet in 45°/0° geometry, measured relative to an $Al_2O_3$ standard, is more than 90%.

Preferably, the emission spectrum of the first phosphor compound of the first phosphor composition of the phosphor mixture according to the invention is formed with a dominant wavelength of between 530 nm and 570 nm.

In particular, the phosphor mixture is designed so that the width at half maximum of the emission band of the first phosphor compound of the first phosphor composition is less than 100 nm.

Preferably, the first phosphor compound of the first phosphor composition comprises an orthosilicate.

The orthosilicate is preferably formed from the formula $(Ba,Sr,Ca)_2SiO_4$.

Preferably, the first phosphor compound of the first phosphor composition may also comprise as a constituent an phosphor from the class of nitrides or oxynitrides as a constituent, in particular $(Sr_{1-x-y}Ba_xCa_y)Si_2O_2N_2$:Eu which is abbreviated to SrSiON below.

Precisely these two first phosphor compounds, which comprise constituents in the form of the orthosilicate or SrSiON, to a particularly great extent allow absorption of the UV radiation from an Hg source and have an emission spectrum in the green to yellow spectral range. These specific first phosphor compounds are furthermore particularly suitable for converting this radiation into the emission spectrum of the phosphor mixture.

Preferably, at least the first phosphor compound of the first phosphor composition is doped with Eu (europium). The weight fraction or mass fraction of the Eu doping preferably lies between 0.1% and 15%. In particular, this interval lies between 0.2% and 2%. It has proven particularly preferable for this mass fraction of the Eu doping to lie between 1% and 2%, especially when the first phosphor compound comprises SrSiON as a constituent.

The second phosphor compound of the first phosphor composition may comprise Tb as a constituent. Thus, in particular, the phosphor mixture may comprise a first phosphor composition which has an emission spectrum in the green to yellow spectral range, this first phosphor composition comprising at least two different phosphor compounds. The first phosphor compound of this first phosphor composition is always free of Tb, while the second phosphor compound of this first phosphor composition may contain Tb. For example, the phosphor CAT and/or LAP may then be provided for the second phosphor compound of the first phosphor composition.

Preferably, when the first phosphor composition comprises a second phosphor compound containing Tb, the mass fraction of second phosphor compounds containing Tb in the first phosphor composition is less than the mass fraction of the Tb-free first phosphor compounds in the first phosphor composition. In particular, this mass fraction of the second phosphor compounds containing Tb is less than the mass fraction of first phosphor compounds containing Eu in the first phosphor composition.

More generally, it is preferable for the mass fraction of phosphor compounds containing Tb in the overall phosphor mixture to be less than the mass fraction of phosphor compounds containing Eu in the phosphor mixture.

Preferably, the second phosphor composition has an emission spectrum in the red spectral range. It is also possible for the second phosphor composition to comprise Eu-doped phosphor compounds.

In particular, the second phosphor composition comprises YOE as a constituent, in particular $Y_2O_3$:Eu.

A specific phosphor compound for the second phosphor composition may be formed as YOE:Eu.

Preferably, the phosphor mixture also comprises a third phosphor composition, which has an emission spectrum in the blue spectral range. The third phosphor composition may have an phosphor compound which comprises BAM or SCAP as constituents. In particular, an phosphor compound of the third phosphor composition may, for example, be BAM:Eu or SCAP:Eu.

Furthermore, the phosphor mixture may comprise a fourth phosphor composition which has an emission spectrum in the blue-green spectral range. In particular, it is advantageous for the fourth phosphor composition to comprise an phosphor compound which has BAMMn as a constituent. For example, BAM:Mn,Eu may be provided as an phosphor compound of the fourth phosphor composition. SCAP:Mn may likewise also be provided as a constituent for the fourth phosphor composition. This specific constituent of an phosphor compound for the fourth phosphor composition may also be doped with Eu.

By combining the first phosphor composition, which emits in the green to yellow spectral range, with a second or third composition emitting in the red and blue spectral range, a desired color temperature can be adjusted particularly efficiently. Instead of a mixture of three phosphor compositions, a fourth phosphor composition may be added which then preferably emits in the blue-green spectral range. The color rendering can thereby be increased.

It is possible for the phosphor mixture according to the invention and/or at least one of the advantageous embodiments to consist exclusively of the compositions respectively mentioned, and therefore comprise no other chemical constituents. It is, however, also possible for this component specification not to be exclusive, but instead the phosphor mixture according to the invention and/or an advantageous embodiment thereof may furthermore also comprise other chemical constituents, in particular other phosphors.

The dominant wavelength of the lamp emission spectrum of the overall phosphor mixture is preferably more than 540 nm. In particular, for color temperatures of less than 2750 K it is more than 575 nm, for color temperatures of less than 2000 K it is more than 585 nm, for color temperatures of less than 1750 K it is more than 590 nm, and for those less than 1250 K it is more than 600 nm.

It should be mentioned explicitly that all chemical formulae indicated for the phosphor mixture and the phosphor compounds refer to ideal formulae, and that all compounds extending beyond these ideal formulae with (minor) differences in stoichiometry are nevertheless also explicitly covered as well by the invention. This applies in particular for differences in which the crystal structure remains the same and the differences in emission and absorption spectra differ in the peak position by less than 1%, and in the peak width by less than 5%.

The following specification may be given as ideal formulae for some other phosphors:

CAT refers to $(Ce,Tb)MgAl_{11}O_{19}$; LAP refers to $(La, Ce,Tb)PO_4$; BAM refers to $(Ba,Eu)MgAl_{10}O_{17}$; BAMMn refers to $(Ba,Eu)(Mg,Mn)Al_{10}O_{17}$; CBT refers to $(Gd, Ce,Tb)(Mg,Zn,Mn)B_5O_{10}$; SCAP refers to $(Sr,Ba,Ca,Mg, Eu)_5(PO_4)_3(F,Cl)$; SCAPm refers to $(Sr,Ba,Ca,Mg,Eu,Mn)_5 (PO_4)_3(F,Cl)$; zinc silicate refers to $(Zn,Mg,Mn)_2SiO_4$; YOE refers to $Y_2O_3$:Eu.

Another aspect of the invention relates to a discharge lamp having a discharge vessel, on which an phosphor layer is formed. At least a first phosphor layer is provided, which comprises an phosphor mixture according to the invention or an advantageous embodiment thereof.

It is thus possible to produce discharge lamps, in particular fluorescent lamps or compact fluorescent lamps, which have no Tb component or a significantly reduced Tb component, and which can therefore be made more economically. Furthermore, discharge lamps can thus be produced which satisfy energy efficiency class A and have increased color rendering, in particular color rendering of 80.

Preferably, the first phosphor layer is formed directly on the inner side of the discharge vessel.

It is also possible for at least one Hg diffusion protection layer to be formed between the first phosphor layer and the inner side of the discharge vessel. The diffusion of Hg ions into the glass of the discharge vessel can thereby be prevented.

Preferably, a protective layer which protects the first phosphor compound against VUV radiation and/or a reaction with Hg ions is formed on the upper side of the first phosphor layer facing away from the inner side of the discharge vessel. This radiation damage protection layer or reaction prevention protective layer may preferably comprise $Al_2O_3$ and/or $Y_2O_3$ as a constituent. Here, VUV radiation refers to radiation with a wavelength of less than 200 nm.

Preferably, a second phosphor layer, which comprises Tb, is formed on the upper side of the first phosphor layer facing away from the inner side of the discharge vessel. This second phosphor layer may for example comprise CAT-YOE as an phosphor mixture. CAT refers to a chemical compound which is essentially described by CeMgAl$_{11}$O$_{19}$:Tb, and YOE is essentially described by Y$_2$O$_3$:Eu. Besides CAT, it is also possible to provide LAP and/or CBT and/or zinc silicate as an alternative green phosphor.

Preferably, the first phosphor compounds of the first phosphor composition of the first phosphor layer are enclosed by a protective layer. This protective layer enclosing the first phosphor compounds preferably comprises metal oxides. In this regard, metal oxides according to Al$_2$O$_3$, Y$_2$O$_3$ or SiO$_2$ may for example be provided.

It is also possible for the protective layer enclosing the first phosphor compounds to comprise borates and/or phosphates. Ternary materials such as aluminum borates and aluminum phosphates may likewise be provided for this protective layer. Metal oxides or materials with a positive surface charge in water are generally to be preferred, since they tend to reduce the Hg adsorption. Al$_2$O$_3$ and Y$_2$O$_3$ are therefore particularly highly suitable. On the other hand, SiO$_2$ protective layers enclosing the first phosphor compounds can often be made particularly leaktight and thin, and produced particularly economically, and lead to an improvement of the radiation stability and the water stability so that they are likewise susceptible of versatile application despite a lower surface charge and a tendency to higher Hg adsorption.

Owing to such a protective layer enclosing the first phosphor compounds, it is possible to achieve criteria in respect of stability relative to the exciting radiation of the phosphor composition, low affinity for Hg and therefore less adsorption of Hg during lamp operation, as well as increased stability in water, so that it is possible to use the currently conventional environmentally friendly coating methods in which a water-based suspension is used.

Owing to the proposed coating with the protective layer for the phosphor compounds, fulfillment of these criteria can be accommodated particularly well. Furthermore, with said specific embodiments of this protective layer, it is possible to achieve maximally leaktight and thin layer formations around the individual phosphor particles or phosphor compounds. These protective layers differ in their composition from the composition inside the phosphor particle or an phosphor compund of the central composition. The composition of the surface may, for example, be determined by surface-sensitive methods such as XPS or SLAMS. The central composition of the phosphor mixture can be determined by volume-sensitive methods such as EDX, RFA, or alternatively by means of chemical analysis.

It is therefore preferable to use such a protective layer in order to coat the first phosphor compounds of the first phosphor composition of a first phosphor layer of the discharge lamp.

It is possible for the phosphor mixture to comprise only phosphor compositions which are all doped with europium. Such an phosphor mixture preferably comprises at most four, in particular at most three phosphor compositions. In this case, YOE (Y$_2$O$_3$:Eu) may be provided as an phosphor compound for the phosphor composition emitting in the red spectral range, BAM or SCAP may be provided as phosphor compounds for the phosphor composition emitting in the blue spectral range, BAMMn or SCAP:Mn may be provided as phosphor compounds for the phosphor composition emitting in the blue-green spectral range, and SrSiON:Eu or orthosilicate:Eu may be provided as the first phosphor compound for the phosphor composition emitting in the green spectral range. The phosphor mixture may then be made by a versatile selection from the phosphor compositions of the phosphor compounds then in turn respectively provided, so that a multiplicity of different phosphor mixtures can be designed.

Preferably, the discharge lamp is designed as a low-pressure Hg discharge lamp. A fluorescent tube or a compact fluorescent lamp may be provided as the discharge lamp.

BRIEF DESCRIPTION OF THE DRAWINGS

Exemplary embodiments of the invention will be explained in more detail below with the aid of schematic drawings, in which.

PREFERRED EMBODIMENT OF THE INVENTION

Figure 1:
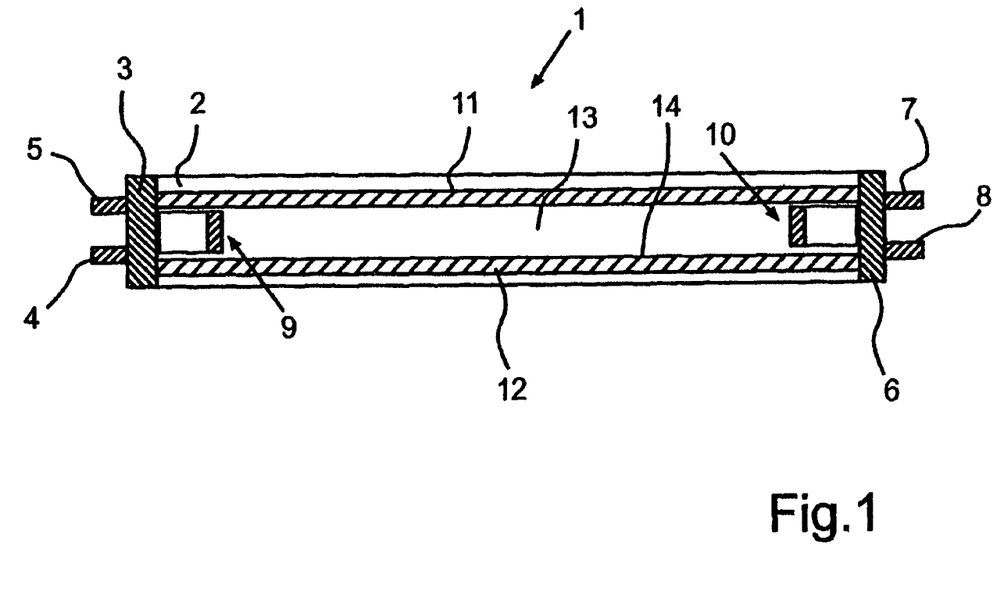
FIG. 1 shows a schematic sectional representation of an embodiment of a discharge lamp according to the invention.

FIG. 1 shows a schematic sectional representation of a discharge lamp 1, which is designed as a low-pressure Hg discharge lamp. The discharge lamp 1 has a linear design and comprises a tubular discharge vessel 2, which is a glass bulb. A cap 3, which has electrical contacts 4 and 5 extending outward, is fitted on one end of the discharge vessel 2. A cap 6, to which outwardly extending contacts 7 and 8 are fastened, is likewise arranged on the opposite side of the discharge vessel 2. These electrical contacts 7 and 8 are electrically connected via electrical leads to an electrode 10, which extends into the discharge space 13 of the discharge vessel 2. Correspondingly, the electrical contacts 4 and 5 are connected to electrical leads which are connected to another electrode 9, this electrode 9 also extending into the discharge space 13 of the discharge vessel 2.

An phosphor layer 12 is formed on an inner side 11 of the discharge vessel 2, and in the exemplary embodiment it extends over the entire length of the discharge vessel 2. The phosphor layer 12 in the exemplary embodiment is formed directly on the inner side 11. Only the phosphor layer 12 is represented in the embodiment shown, although another layer may also be formed on the upper side 14 facing toward the discharge space 13 and therefore on the upper side 14 facing away from the inner side of the discharge vessel 2. This may for example be a protective layer, in particular for the first phosphor compounds or phosphor particles of the phosphor layer 12.

Another phosphor layer may likewise be formed on this upper side 14. Another layer may likewise be arranged and formed between the phosphor layer 12 and the inner side 11.

The phosphor compounds are preferably enclosed by a protective layer of metal oxides, a borate, a phosphate or a ternary material.

The phosphor layer 12 comprises an phosphor mixture, which has a first and at least one second phosphor composition. The first phosphor composition has an emission spectrum in the green to yellow spectral range. The first phosphor composition comprises a first phosphor compound, which is designed to be free of Tb and is designed to absorb the UV radiation emitted by an Hg source. The term Hg source is intended in particular to mean Hg atoms and Hg ions in the discharge space 13, which emit in particular the UV radiation by electron excitation. The first phosphor compound of the first phosphor composition is furthermore designed to convert the absorbed UV radiation into the emission spectrum of the phosphor compound. The mass fraction of the first phosphor composition in relation to the total mass fraction of the phosphor mixture is less than or equal to 50%. The phosphor mixture is furthermore designed so that the discharge lamp 1 generates light with color temperatures of more than 2500 K.

By combining the first phosphor composition, which is designed for emission in the green to yellow spectral range, with a second phosphor composition which is designed for emission in the red spectral range, and a third phosphor composition which is designed for emission in the blue spectral range, it is possible to set the desired color temperature. Instead of an phosphor mixture with three phosphor compositions, the phosphor mixture may also comprise a fourth phosphor composition which is designed for emission in the blue-green spectral range. The color rendering can be increased by adding such a fourth phosphor composition.

In one embodiment, the phosphor mixture may comprise $(Ba,Sr,Ca)_2SiO_4$:Eu or $(Ba,Sr,Ca)SiON$:Eu as the first phosphor compound of the first phosphor composition. YOE:Eu may be provided as an phosphor compound of the second phosphor composition for emission in the red spectral range. Furthermore, BAM or SCAP:Eu may be provided as an phosphor composition for the third phosphor composition for emission in the blue spectral range. In addition, BAMMn:Eu may be provided as an phosphor for a fourth phosphor composition for emission in the blue-green spectral range. The phosphor mixture then consists of three or four phosphor compositions, in which case a selection may be made from said phosphor compounds.

In another exemplary embodiment, the phosphor mixture may consist of more than three phosphor compositions, in which case a selection may likewise be made from the phosphor compounds already mentioned above. In addition, in this exemplary embodiment, second phosphor compounds which are designed to contain Tb, and which may for example be CAT or LAP, may be provided for the first phosphor compositions. CAT refers to a chemical compound which is essentially described by $CeMgAl_{11}O_{19}$:Tb. LAP in this regard refers to a chemical compound which is essentially described by $LaPO_4$:Ce,Tb.

What is essential is that the mass fraction of the phosphors containing Tb is less than the mass fraction of phosphor compounds containing Eu in the first phosphor composition emitting in the green spectral range.

Figure 2:
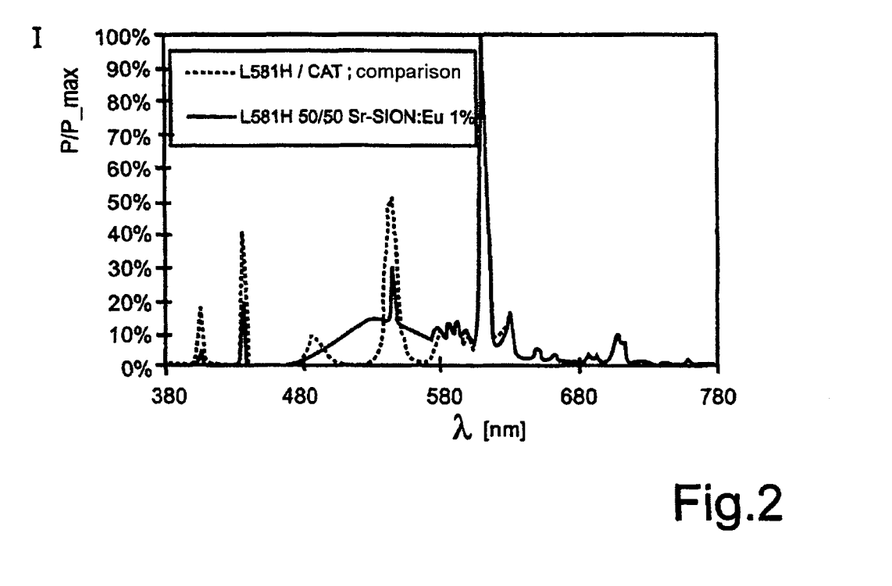
FIG. 2 shows an emission spectrum of a discharge lamp having phosphor mixtures according to the prior art, in comparison with an exemplary embodiment of an phosphor mixture according to the invention having a specific mixing ratio in relation to the total mass of the phosphor mixture.

FIG. 2 shows a diagram in which the percentage emission intensity is represented as a function of the wavelength $\lambda$. The emission spectrum shown in FIG. 2 is that of a discharge lamp according to FIG. 1. The dashed line shows an emission spectrum of the discharge lamp 1, which is designed according to the prior art and therefore comprises an phosphor layer which has $Y_2O_3$:Eu (L581H) and CAT as phosphor compounds.

In FIG. 2, the solid line furthermore shows the emission spectrum of a discharge lamp 1 according to the invention according to FIG. 1, in which the phosphor layer 12 comprises an phosphor mixture according to the invention. In the emission spectrum according to FIG. 2, this phosphor mixture is made of $Y_2O_3$:Eu (L581H) as a second phosphor compound and SrSiON:Eu as a first phosphor compound. The mixing ratio of the two phosphor compounds in said specific exemplary embodiment of an phosphor mixture according to the invention is in each case 50% (50/50) of the total mass of the phosphor mixture. In the exemplary embodiment, the first phosphor compound is doped with Eu, the mass fraction or weight fraction of Eu being 1%. The 50/50 mass fractions are expressed in terms of a total mass of 100.

Figure 3:
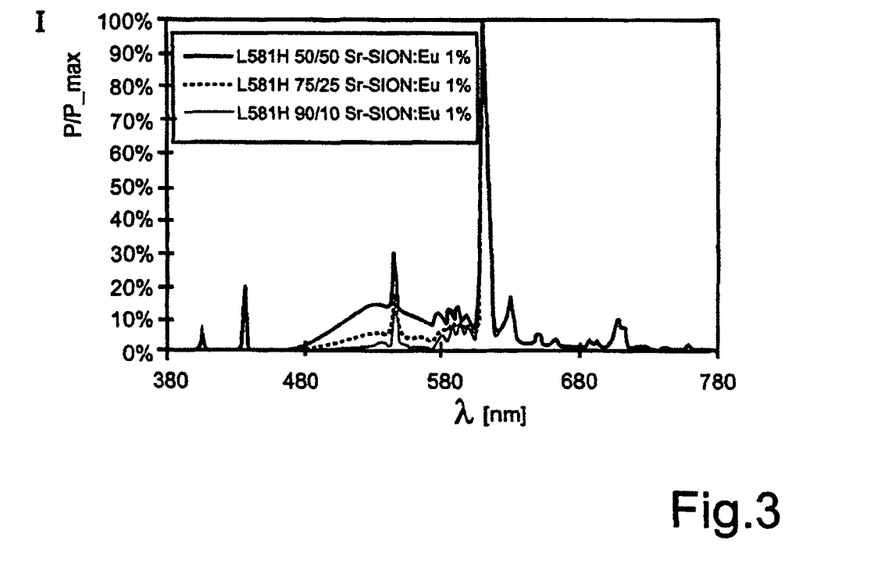
FIG. 3 shows an emission spectrum of phosphor mixtures according to the invention with different mass ratios between the first and second phosphor compounds.

FIG. 3 shows a diagram in which the percentage emission intensity I is represented as a function of the wavelength $\lambda$. The diagram according to FIG. 3 shows emission spectra of various exemplary embodiments of an phosphor mixture according to the invention, with different mass ratios between the two phosphor compounds of the phosphor mixtures. As may be seen in the diagram, phosphor mixtures are represented with their emission spectrum, the mass distributions between the second phosphor compound $Y_2O_3$:Eu (L581H) and the first phosphor compound SrSiON:Eu being 50% to 50% (50/50), 75% to 25% (75/25) and 90% to 10% (90/10). The emission spectra of the aforementioned three different embodiments of the phosphor mixture according to the invention are shown in the stated order by the thick solid line, by the dashed line and by the thin solid line.

Figure 4:
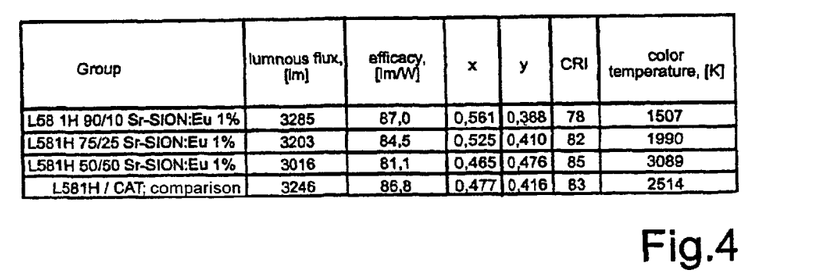
FIG. 4 shows photoelectrical values of a discharge lamp having an phosphor mixture according to the prior art, on the one hand, and exemplary embodiments of phosphor mixtures according to the invention on the other hand.

The table according to FIG. 4 shows the photoelectrical values for a discharge lamp 1 according to FIG. 1, designed as a T8L36W tube lamp. The first three rows show photoelectrical values for this discharge lamp 1 when the phosphor layer 12 respectively comprises the different embodiments of the phosphor mixture according to the invention. In comparison with this, the final, fourth row of the table according to FIG. 4 gives an indication of the photoelectrical values when this said discharge lamp 1 is formed with an phosphor known from the prior art in the phosphor layer.

In the simplified representation of a discharge lamp 1 according to FIG. 1, the phosphor layer 12 is applied directly on the inner side 11 of the discharge vessel 2. Further phosphor layers or other additional layers, for example protective layers or the like, are not shown in the diagram.

It is, however, also possible for the discharge vessel 2 to comprise at least one additional further coating. In this case, at least one additional coating may be formed between the inner side 11 of the discharge vessel 2 and the first phosphor layer 12. This intermediate layer is preferably designed as a layer protecting against Hg diffusion into the glass of the discharge vessel 2.

In addition to or instead of this, at least two first phosphor layers 12 may be formed on the discharge vessel 2.

Starting from the representation according to FIG. 1, it is also possible for a further layer to be formed on the upper side 14 of the first phosphor layer 12. This further layer, facing toward the discharge space 13, may likewise be a protective layer which protects the phosphor compounds of the first phosphor layer 12 for protection against radiation damage in the VUV spectral range or against reactions with Hg ions.

A corresponding coating may also be applied directly onto the individual phosphor compounds or phosphor particles of the phosphor mixture of the first phosphor layer 12. For example, such a radiation damage protection layer and/or reaction prevention protective layer may be formed as $Al_2O_3$ or $Y_2O_3$.

In addition to or instead of this, it is possible for at least one first phosphor layer 12 comprising an phosphor mixture according to the invention to be formed on the discharge vessel 2, in which case an additional second phosphor layer (not shown) which comprises Tb (terbium) as a constituent may be applied between the discharge space 13 and this first phosphor layer 12. In particular, the first phosphor layer may be an phosphor mixture according to the invention formed without Tb. The second phosphor layer may, for example, comprise an phosphor mixture of the phosphor compounds CAT and YOE.

All the explained exemplary embodiments may also be combined with one another in any desired way, so that a very wide variety of layer formations and configurations of the individual phosphor layers and protective layers can be obtained.

Figure 5:
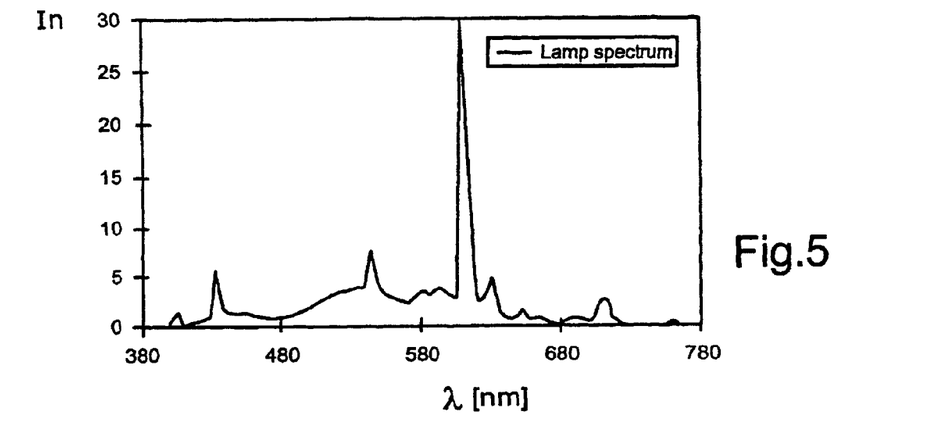
FIG. 5 shows a diagram in which the emission spectrum of the discharge lamp is shown for a color temperature of 3500 K.

In FIG. 5, an emission spectrum of a discharge lamp 1 for a color temperature of 3500 K (x/y 0.439/0.409) is determined by superposition and represented. The additional emission generated by the blue phosphor compound BAM:Eu can be seen at a wavelength λ of 450 nm. The phosphor mixture in the diagram shown in FIG. 5 comprises the phosphor compounds $Y_2O_3$:Eu, BAM:Eu and SrSiON:Eu.

Measurements of the dominant wavelength (lambda_dom) of lamp samples have shown that the data (measurement points) for compact fluorescent lamps (CFL) and tube lamps (FL) coincide very well.

The lamp emission spectrum generated by the phosphor mixture achieves dominant wavelengths in the following ranges:

Preferably, the dominant wavelength of the lamp emission spectrum of the overall phosphor mixture is more than 540 nm. In particular, for color temperatures of less than 2750 K it is more than 575 nm, for color temperatures of less than 2000 K it is more than 585 nm, for color temperatures of less than 1750 K it is more than 590 nm, and for those less than 1250 K it is more than 600 nm.

The dominant wavelength is determined in the CIE 1931 xy chromaticity diagram. It corresponds to the wavelength of the spectral color locus (boundary curve of the color diagram) at which the straight line through the white point at x=0.313 and y=0.337 and the measured color position x, y of the phosphor mixture intersects with the spectral color locus.

Figure 6:
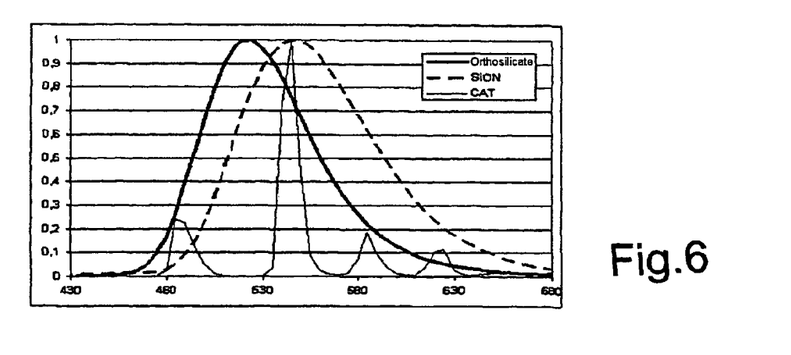
FIG. 6 shows a diagram in which the calculated luminous efficiencies and color rendering indices are represented for various phosphors.

FIG. 6 shows a diagram in which the luminous efficiencies in lm/W and the color rendering indices Ra are represented as a function of the wavelength, curve profiles being shown for three different phosphors: orthosilicate, SiON and CAT. By means of computer simulation, the luminous efficiency [lm/W] and color rendering Ra achievable in a T8 L36W/840 lamp (color temperature 4000 K, color rendering index>80) were calculated for different RGB triple-band mixtures. The same red phosphor YOE, the same blue phosphor BAM, but different green phosphors were respectively used in the mixture. Besides CAT (as a reference green phosphor containing terbium), two different alternative $Eu^{2+}$-activated green phosphors were selected: orthosilicate with the ideal formula $(Sr,Ba,Eu)_2SiO_4$ and SiON with the ideal formula $SrSi_2O_2N_2$:Eu. The emission spectra of the three green phosphors are represented comparatively in FIG. 6.

The following assumptions were made in the calculation:
(a) all phosphors with the same QE=80%.
(b) the LED phosphors fully absorb the 405 nm, 407 nm, 436 nm Hg radiation and convert it according to their quantum efficiency.

As a result of the calculation, a luminous efficiency of 94.3 lm/W and a CRI value of 82.3 were found for CAT. For orthosilicate, a luminous efficiency of 88.3 lm/W and a CRI value of 86.0 were found. For SiON, a luminous efficiency of 94.8 lm/W and a CRI value of 80.5 were found.

The invention claimed is:

1. A phosphor mixture for a discharge lamp which comprises:
(a) a first phosphor composition having an emission spectrum in the green and/or yellow spectral range, and comprises (i) a first phosphor compound which is free of Tb and is capable to absorb the UV radiation emitted by an Hg source and has an orthosilicate of the formula $(Ba,Sr,Ca)_2SiO_4$:Eu or an oxynitride of the formula $(Sr_{1-x-y}Ba_xCa_y)Si_2O_2N_2$:Eu (SrSiON), and (ii) at least one second phosphor compound which contains Tb, and which is selected from the group consisting of $(Ce,Tb)MgAl_{11}O_{19}$ and $(La,Ce,Tb)PO_4$,
wherein a mass fraction of the second phosphor compound is less than a mass fraction of the first phosphor compound, and
(b) a second phosphor composition having an emission spectrum in the red spectral range and comprises $Y_2O_3$:Eu.

2. The phosphor mixture as claimed in claim 1, wherein the first phosphor compound of the first phosphor composition is capable to convert the absorbed UV radiation into its emission spectrum.

3. The phosphor mixture as claimed in claim 1, wherein the color temperature of the emitted radiation is operable to be set as a function of an adjustable mass ratio between the first and second phosphor compositions.

4. The phosphor mixture as claimed in claim 3, wherein a mass fraction of the first phosphor composition is less than or equal to 50% of the compound mixture.

5. The phosphor mixture as claimed in claim 3, wherein the color temperature is more than 2500 K.

6. The phosphor mixture as claimed in claim 1, wherein the first phosphor compound of the first phosphor composition has a strong absorption for radiation with wavelengths of less than 440 nm.

7. The phosphor mixture as claimed in claim 6, wherein the first phosphor compound of the first phosphor composition has a very strong absorption for radiation with wavelengths of about 254 nm.

8. The phosphor mixture as claimed in claim 7, wherein the first phosphor compound of the first phosphor composition has a weak absorption for radiation with wavelengths of more than 530 nm.

9. The phosphor mixture as claimed in claim 1, wherein the emission spectrum of the first phosphor compound of the first phosphor composition has a dominant wavelength of between 530 nm and 570 nm.

10. The phosphor mixture as claimed in claim 1, wherein the width at half maximum of the emission band of the first phosphor compound of the first phosphor composition is less than 100 nm.

11. The phosphor mixture as claimed in claim 1, wherein the first phosphor compound of the first phosphor composition is doped with Eu, and a mass fraction of the Eu doping lies between 0.1% and 15%.

12. The phosphor mixture as claimed in claim 11, wherein the mass fraction of the Eu doping lies between 1% and 2%.

13. A phosphor mixture for a discharge lamp which comprises:
(a) a first phosphor composition having an emission spectrum in the green and/or yellow spectral range, and comprises (i) a first phosphor compound which is free of Tb and is capable to absorb the UV radiation emitted by an Hg source and has an orthosilicate of the formula (Ba, Sr,Ca)$_2$SiO$_4$:Eu or an oxynitride of the formula (Sr$_{1-x-y}$Ba$_x$Ca$_y$)Si$_2$O$_2$N$_2$:Eu (SrSiON), and (ii) at least one second phosphor compound which contains Tb, and which is selected from the group consisting of (Ce,Tb)MgAl$_{11}$O$_{19}$ and (La,Ce,Tb)PO$_4$, wherein a mass fraction of the second phosphor compound is less than a mass fraction of the first phosphor compound;

(b) a second phosphor composition having an emission spectrum in the red spectral range and comprises Y$_2$O$_3$:Eu; and (C) a third phosphor composition having an emission spectrum in the blue spectral range, wherein the third phosphor composition has a phosphor compound which comprises (Ba,Eu)MgAl$_{10}$O$_{17}$ or (Sr,Ba,Ca,Mg,Eu)$_5$(PO$_4$)$_3$(F,Cl) as constituents, and wherein the phosphor compound of the third phosphor composition is doped with Eu.

14. A phosphor mixture for a discharge lamp which comprises:

(a) a first phosphor composition having an emission spectrum in the green and/or yellow spectral range, and comprises (i) a first phosphor compound which is free of Tb and is capable to absorb the UV radiation emitted by an Hg source and has an orthosilicate of the formula (Ba,Sr,Ca)$_2$SiO$_4$:Eu or an oxynitride of the formula (Sr$_{1-x-y}$Ba$_x$Ca$_y$)Si$_2$O$_2$N$_2$:Eu(SrSiON), and (ii) at least one second phosphor compound which contains Tb, and which is selected from the group consisting of (Ce,Tb)MgAl$_{11}$O$_{19}$ and (La,Ce,Tb)PO$_4$, wherein a mass fraction of the second phosphor compound is less than a mass fraction of the first phosphor compound;

(b) a second phosphor composition having an emission spectrum in the red spectral range and comprises Y$_2$O$_3$:Eu; and (c) a fourth phosphor composition having an emission spectrum in the blue-green spectral range, wherein the fourth phosphor composition has a phosphor compound which comprises (Ba,Eu)(Mg,Mn)Al$_{10}$O$_{17}$ as a constituent, and wherein the phosphor compound of the fourth phosphor composition is doped with Eu.

15. A discharge lamp comprising a discharge vessel on which a phosphor layer is formed, wherein at least a first phosphor layer is formed which comprises the phosphor mixture as claimed in claim 1.

16. The discharge lamp as claimed in claim 15, wherein the first phosphor layer is disposed directly on an inner side of the discharge vessel.

17. The discharge lamp as claimed in claim 16, which further comprises a second phosphor layer, which comprises Tb, and is disposed on an upper side of the first phosphor layer facing away from the inner side of the discharge vessel.

18. The discharge lamp as claimed in claim 17, wherein the second phosphor layer comprises a mixture of (Ce,Tb)MgAl$_{11}$O$_{19}$ and Y$_2$O$_3$:Eu.

19. The discharge lamp as claimed in claim 16, which further comprises a protective layer, such that the first phosphor compound of the first phosphor composition of the first phosphor layer is enclosed by the protective layer.

20. The discharge lamp as claimed in claim 19, wherein material components of the protective layer are different from the first phosphor compound of the first phosphor composition.

21. The discharge lamp as claimed in claim 19, wherein the protective layer comprises metal oxides.

22. The discharge lamp as claimed in claim 19, wherein the protective layer comprises borates and/or phosphates.

23. The discharge lamp as claimed in claim 19, wherein the protective layer comprises SiO$_2$.

24. The discharge lamp as claimed in claim 15, which further comprises at least one Hg diffusion protection layer, which is disposed between the first phosphor layer and the inner side of the discharge vessel.

25. The discharge lamp as claimed in claim 15, which further comprises a protective layer for protecting the first phosphor compound against VUV radiation and/or a reaction with Hg ions, which is disposed on an upper side of the first phosphor layer facing away from an inner side of the discharge vessel.

26. The discharge lamp as claimed in claim 25, wherein the protective layer comprises Al$_2$O$_3$ and/or Y$_2$O$_3$.

27. The discharge lamp as claimed in claim 15, which is a low-pressure Hg discharge lamp.

28. A phosphor mixture for a discharge lamp which comprises:

(a) a first phosphor composition having an emission spectrum in the green and/or yellow spectral range, and comprises (i) a first phosphor compound which is free of Tb and is capable to absorb the UV radiation emitted by an Hg source and has an orthosilicate of the formula (Ba,Sr,Ca)$_2$SiO$_4$:Eu or an oxynitride of the formula (Sr$_{1-x-y}$Ba$_x$Ca$_y$)Si$_2$O$_2$N$_2$:Eu(SrSiON), and (ii) at least one second phosphor compound which contains Tb, and which is selected from the group consisting of (Ce,Tb)MgAl$_{11}$O$_{19}$ and (La,Ce,Tb)PO$_{4,4}$, wherein a mass fraction of the second phosphor compound is less than a mass fraction of the first phosphor compound;

(b) a second phosphor composition having an emission spectrum in the red spectral range and comprises Y$_2$O$_3$:Eu;

(c) a third phosphor composition having an emission spectrum in the blue spectral range; and (d) a fourth phosphor composition having an emission spectrum in the blue-green spectral range, wherein the fourth phosphor composition has a phosphor compound which comprises (Ba,Eu)(Mg,Mn)Al$_{10}$O$_{17}$ as a constituent, and the phosphor compound of the fourth composition is doped with Eu.

29. The phosphor mixture as claimed in claim 28, wherein the third phosphor composition has a phosphor compound which comprises (Ba,Eu)(Mg,Mn)Al$_{10}$O$_{17}$ or (Sr,Ba,Ca,Mg,Eu)$_5$(PO$_4$)$_3$(F,Cl), and wherein the phosphor compound of the third phosphor composition is doped with Eu.

* * * * *

UNITED STATES PATENT AND TRADEMARK OFFICE
CERTIFICATE OF CORRECTION

PATENT NO. : 8,729,786 B2  Page 1 of 1
APPLICATION NO. : 12/452193
DATED : May 20, 2014
INVENTOR(S) : Jermann et al.

It is certified that error appears in the above-identified patent and that said Letters Patent is hereby corrected as shown below:

In the Claim

Column 12, Line 38, Claim 28, delete "$PO_{4,4}$" and insert --$PO_4$--.

Signed and Sealed this
Eighteenth Day of November, 2014

Michelle K. Lee
*Deputy Director of the United States Patent and Trademark Office*